Figure 1:
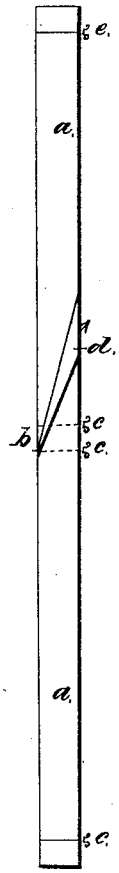
Figure 2:
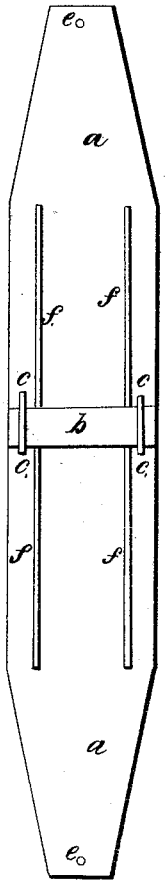

4724X

P. Howes.

Cutting Shingles.

Patented Mar. 30, 1827.

AM. PHOTO-LITHO. CO. N.Y. (OSBORNE'S PROCESS)

MISSING PAGE TEMPORARY NOTICE

PATENT # 4724X FOR ISSUE DATE 3-30-1827

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All Text